Sept. 11, 1962 R. J. WORBOIS 3,053,597
APPARATUS FOR REMOTELY CONTROLLING OPERATION OF
BRAKE CYLINDER RELEASE VALVES ON
CARS OF RAILWAY TRAINS
Filed July 25, 1961
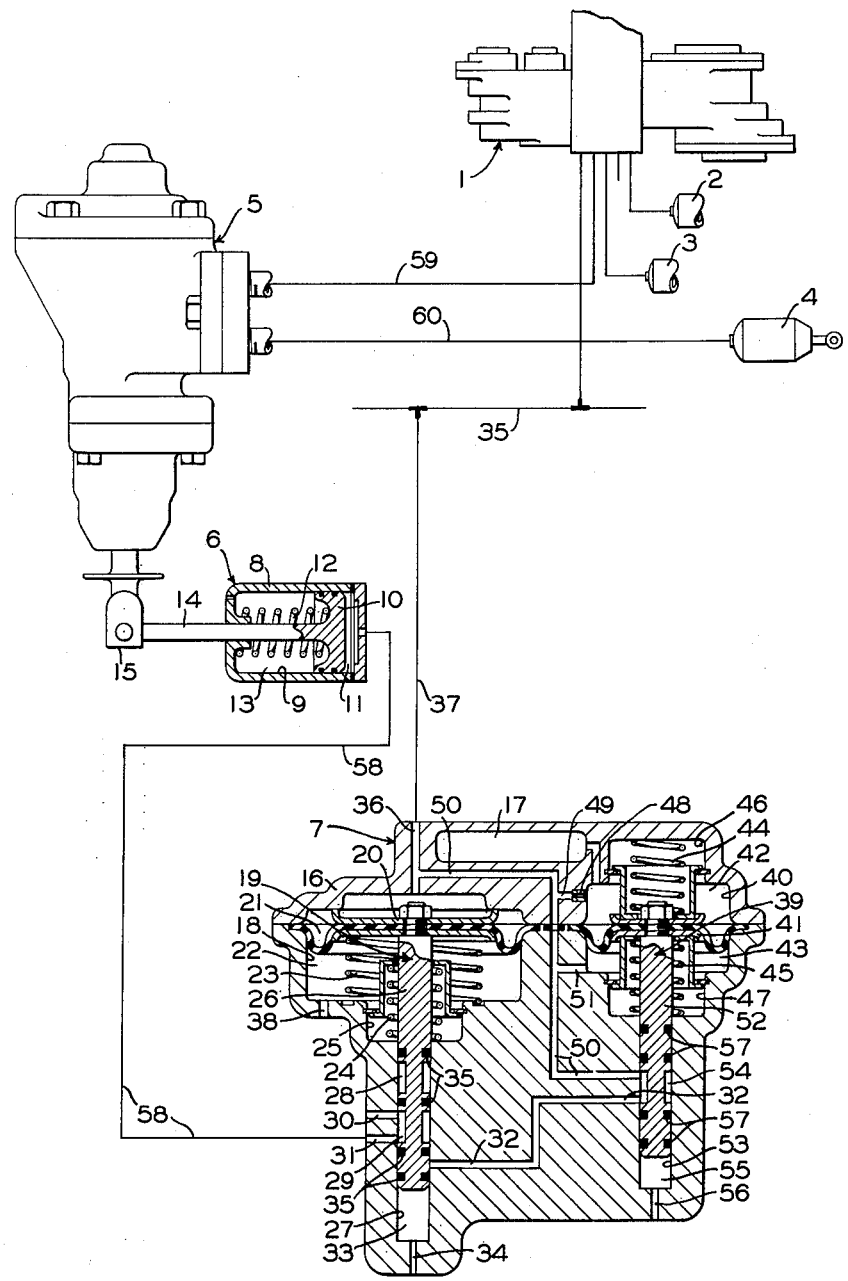
INVENTOR.
Robert J. Worbois
BY
A. A. Steinmiller
Attorney 3,053,597
APPARATUS FOR REMOTELY CONTROLLING OPERATION OF BRAKE CYLINDER RELEASE VALVES ON CARS OF RAILWAY TRAINS
Robert J. Worbois, Irwin, Pa., assignor to Westinghouse Air Brake Company, Wilmerding, Pa., a corporation of Pennsylvania
Filed July 25, 1961, Ser. No. 126,539
6 Claims. (Cl. 303—69)

This invention relates to apparatus for remotely controlling operation of brake cylinder release valves on a train of railway cars from a central control station, such as the locomotive, and, more particularly, to such apparatus for controlling operation of said release valves by variations in the brake pipe pressure without undesired operation thereof incidental to increase or reduction of brake pipe pressure during a brake release or application.

On each car of a railway train there is commonly included a brake cylinder release valve, which may be of the type disclosed in U.S. Patent 2,392,185 of L. I. Pickert, to enable a release of brake cylinder pressure on each car during switching operations without venting the brake equipment and without necessitating the complete recharging of the brake pipe thereon. Heretofore, operation of each brake cylinder release valve to effect release of air from the brake cylinder has been effected individually under manual control by having the trainman walk alongside each car of the train to be switched and manually operate the brake cylinder release valve pull rod from the side of each car. The time required for the trainman to traverse the length of a train, operating each brake cylinder release valve on each car individually is substantial, causing delays in making up trains, and also in cases of inclement weather imposing hardship on the trainman.

It is accordingly the object of this inventon to provide apparatus for enabling the operation of all the brake cylinder release valves on a train of cars from a central station, such as the locomotive, by variation of the brake pipe pressure, without, however, obtaining undesired operation of the brake cylinder release valve by variations of brake pipe pressure incidental to brake release or brake application on the train.

According to the present invention, the new and novel control apparatus comprises a valve mechanism on each car of a train operatively responsive to a predetermined low pressure supply of fluid to the brake pipe at a predetermined rate to effect supply of fluid under pressure to a fluid pressure operated actuator which effects operation of a brake cylinder release valve on a corresponding car, the valve mechanism being so constructed as to be non-operative during a brake application or period of brake pipe recharging.

The accompanying drawing is a diagrammatic view, partly in section, of major elements of a railway car brake equipment embodying the new and novel control apparatus of the present invention.

Description

Referring to the drawing, the car brake equipment shown includes a control valve 1 of the well-known AB type, an auxiliary reservoir 2, a supply reservoir 3, a brake cylinder 4, and a brake cylinder release valve device 5, illustratively shown as of the type described in U.S. Patent 2,392,185 of L. I. Pickert, issued January 1, 1946, said device being hereinafter referred to as the "release valve." Also included in the equipment is a release valve actuator 6, hereinafter referred to as the "actuator," for operating the release valve, and a release valve control device 7, hereinafter referred to as the "release control device."

The AB type control valve 1 with the accompanying reservoirs and brake cylinder 4 are well known, thereby rendering detailed showing and description thereof unnecessary to an understanding of the present invention.

Similarly, the details of the release valve 5 are comparatively well known and not necessary to an understanding of the present invention, but reference may be had to the previously mentioned Patent 2,392,185 for structural and operational details thereof.

The actuator 6 is an air pressure type power cylinder comprising a casing 8 having a bore 9 in which a piston 10 slidably operates. A pressure chamber 11, formed on one side of the piston, receives fluid under pressure to act in opposition to a spring 12 in a spring chamber 13 on the opposite side of said piston. An extended piston rod 14 connects the piston 10 to the fork 15 on the release valve 5 where a hand-operated pull rod normally is connected in equipments previously used.

The release control device 7 comprises a casing 16 having a plurality of internal bores and a volume chamber 17. A bore 18 houses a valve device 19 operated by a diaphragm type piston 20 having a pressure chamber 21 on one side and a vented spring chamber 22 on the opposite side thereof. Spring chamber 22 houses a biasing spring 23 of approximately 8 p.s.i. biasing force and a caged spring 24 of approximately 20 p.s.i. biasing force located concentrically within the said biasing spring in a counterbore 25. A piston stem 26 extends through the spring chamber 22 and the counterbore 25 into a valve bore 27 where said stem is constructed in a spool valve form with two circumferential valve grooves 28 and 29 which are slidably positioned to communicate with passages 30, 31 and 32 according to the positioning of the stem 26 in the valve bore 27. A chamber 33 at the outer end of the stem 26 in valve bore 27 is vented to atmosphere at port 34. Suitable O-rings 35 are located on the stem 26 to prevent communication between the valve grooves and the chamber 33. The pressure chamber 21 is connected to the train brake pipe 35 via passage 36 and pipe 37. The spring chamber 22 is vented to atmosphere at port 38.

The release control device 7 also includes a rate responsive piston valve device 39 in a bore 40, said piston valve device comprising a diaphragm piston 41 having a restricted rate pressure chamber 42 on one side thereof and a charging rate pressure chamber 43 on the other side thereof, each of said chambers 42 and 43 housing caged springs 44 and 45 in counterbores 46 and 47 respectively. The restricted rate pressure chamber 42 is in communication with the volume chamber 17 directly and also with the brake pipe 35 by way of a choke 48, passage 49, passage 50, passage 36 and pipe 37. The charging rate pressure chamber 43 is in communication with the brake pipe 35 by way of unrestricted passage 51, passage 50, passage 36 and pipe 37. A piston stem 52 extends through the chamber 43 and counterbore 47 into a valve bore 53 where said stem is constructed in a spool valve form with circumferential valve groove 54 which is slidably positioned in said bore to communicate with passages 50 and 32 according to movement of the stem 52 within the valve bore 53. A chamber 55 is formed by the stem 52 and the bore 53 at the outer end of said stem 52, said chamber 55 being vented to atmosphere at a port 56. Suitable O-rings 57 are located on the stem 52 to prevent communication between the valve groove 54 and the chambers 43 and 55.

Operation

In operation, assume a normally conditioned train is stopped in a yard with the brakes applied, the usual brake pipe reduction having been made to apply the brakes throughout the train, and that it is desired to cut out one or more cars carrying the described brake equipment.

On removal of the car from the train, the brake pipe 35 is vented to atmosphere and the control valve 1 functions in its normal manner to establish communication between the auxiliary and supply reservoirs 2 and 3 to the brake cylinder 4 by way of the release valve 5 in a normal manner to apply the brakes on the removed car and the remainder of the train. When a switcher locomotive is coupled to the car removed, or in the case where a locomotive is changed, the switcher locomotive is coupled to the train, the situation arises where it is desired to release the brakes without draining reservoirs and without completely recharging the brake pipe. On such occasion when the switcher locomotive has been coupled to the train or portion thereof to be moved, the operator on the switcher locomotive initiates a predetermined low pressure recharging of the brake pipe 35 of a pressure at approximately 16 p.s.i. The build-up of fluid pressure in the brake pipe 35 to the pressure of approximately 16 p.s.i. is accompanied by a corresponding supply of fluid under pressure via pipe 37, passage 36, and passage 50 to both of passages 49 and 51. In that passage 49 leading to the restricted rate pressure chamber 42 of the rate responsive piston valve 39 is restricted by the choke 48 and the volume 17 is connected to the chamber 42 and the passage 51 is unrestricted, the pressure build-up in the charging rate pressure chamber 43 is much more rapid, resulting in an upward movement (as shown in the drawing) of the diaphragm piston 41 and simultaneous movement of the piston stem 52 to blank off communication between the passage 50 and passage 32 at the valve groove 54. When the brake pipe pressure is stabilized at approximately 16 p.s.i., the build-up of pressure in the brake pipe 35 and consequently passage 50 of the release control device 7 is stopped to permit the pressure of fluid in the pressure chambers 42 and 43 to equalize to allow the caged springs 44 and 45 to return the diaphragm piston 41 and piston stem 52 to a normal position (as shown) wherein the passage 50 supplies fluid under brake pipe pressure via valve groove 54 to passage 32. It can thus be seen that due to the presence of choke 48 in passage 49, that during charging of the brake pipe the piston diaphragm 41 and piston stem 52 will be raised to blank off passage 50; during venting of brake pipe the reduction in pressure in chamber 43 is more rapid than in chamber 42 thereby effecting downward movement of diaphragm piston 41 and piston stem 52 to cause blanking-off of passage 50 at valve groove 54; and that only when the pressure in the brake pipe 35 and consequently the passage 50 is stabilized at any one pressure will the piston diaphragm 41 and piston stem 52 be in a normal position (as shown) wherein the brake pipe pressure is in direct communication with the passage 32 by way of passage 50 and valve groove 54.

Simultaneously, with supply of brake pipe pressure to passage 50, brake pipe pressure is transmitted via pipe 37 and passage 36 to the pressure chamber 21 of the release control device 7. Prior to any movement of the diaphragm piston 20, the valve groove 29 in the piston stem 26 has vented the pressure chamber 11 of the actuator 6 by way of a pipe 58, passage 31, valve groove 29 and passage 30 to thereby render the actuator 6 inoperative to release the brakes as explained hereinafter. The supply of 16 p.s.i. brake pipe pressure, acting on one side of the diaphragm piston 21 in opposition to the 8 p.s.i. biasing force of the spring 23 on the opposite side, results in an 8 p.s.i. differential acting on the diaphragm piston to cause said piston to move downward (as shown in the drawing) to a charging position engaging the caged spring 24. This differential fluid pressure force is insufficient to overcome the resistance of the caged spring 24 and consequently the described downward movement of diaphragm piston 20 is stopped in the charging position in which the piston stem 26 is positioned such that the venting communication of pipe 58 is blanked-off at the stem 26 and communication is established between pipe 58 and passage 32 by way of passage 31 and valve groove 29. As previously described, if the brake pipe pressure is building up or reducing, the rate responsive valve 39 will blank off passage 32, but if the brake pipe pressure has stabilized at approximately 16 p.s.i., brake pipe pressure will be permitted to flow via pipe 37, passage 36, passage 50, valve groove 54, passage 32, valve groove 29, passage 31 and pipe 51 to the pressure chamber 11 of the actuator 6.

Supply of fluid under pressure to the chamber 11 of the actuator 6 causes the piston 10 and piston rod 14 thereof to be moved to the left (as shown in the drawing) in opposition to the biasing force of spring 12 to thereby tilt the fork 15 of the release valve 5. Tilting the fork 15 of the release valve 5 causes operation of the release valve in a usual well-known manner to cut off communication in the pipes 59 and 60 between the brake cylinder 4 and the supply reservoir 3 and vents the brake cylinder to atmosphere at the release valve, thereby releasing the brakes.

Should the brake pipe pressure increase above a predetermined pressure of say 20 p.s.i. (as regulated by the force of caged spring 24), the caged spring 24 will be compressed to permit further downward movement of the diaphragm piston 21 and piston stem 26 to a third position wherein the communication between passages 31 and 32 is blanked-off and the pressure chamber 11 of the actuator 6 is vented to atmosphere by way of pipe 58, passage 31, valve groove 28, and passage 30, thereby preventing automatic operation of the release valve 6. In view of this it can be seen that under normal train operating conditions, in which the brake pipe pressure is well over 20 p.s.i., the automatic operation of the release valves 6 is thus prevented.

If the brake pipe pressure is reduced below a predetermined pressure of say 8 p.s.i. (as regulated by the biasing force of spring 23), the spring 23 will return the diaphragm piston 21 and piston stem 26 to its normal position (shown) wherein the communication between passages 31 and 32 is blanked-off, and the pressure chamber 11 of the actuator 6 is vented to atmosphere by way of pipe 58, passage 31, valve groove 29 and passage 30, to thereby prevent automatic operation of the release valve 6 when brake release is not desired.

It can thus be seen that automatic operation of the release valve 6 is dependent on the supply of fluid under pressure to the pressure chamber 11 of the actuator 6, such supply being from the brake pipe 35 to the passage 32 under the control of the rate responsive piston valve 35 only when brake pipe pressure is not being changed or reduced, and thence to passage 31 and pipe 58 under the control of the pressure responsive piston valve 19 only when the brake pipe pressure is within the prescribed limits of 8 to 20 p.s.i., as regulated by the springs 23 and 24.

It will be understood that while the operation of only one car equipment has been described, the equipment on other cars of the train operates similarly and substantially simultaneously. Accordingly, it will seem that a substantial saving of time and effort is accomplished, by the control apparatus herein disclosed, in the switching operations of railroads.

Having now described the invention, what I claim as new and desire to secure by Letters Patent, is:

1. For use in a train brake equipment including on each car a control valve, a brake cylinder and a brake cylinder pressure release valve, and a brake pipe extending throughout the train from the locomotive to each car thereof, a remotely controlled brake cylinder pressure release apparatus comprising an actuator device on each car effective upon supply of fluid under pressure thereto to operate the brake cylinder pressure release valve on the corresponding car of the train, and valve means on each car operatively responsive to supply of fluid pressure thereto from the brake pipe at less than a predetermined rate and within a predetermined range of pressure, as controlled remotely on the locomotive, to effect supply of fluid under pressure to said actuator device to cause operation of the brake cylinder pressure release valve to effect a brake release.

2. Apparatus for remotely controlling operation of a brake cylinder release valve on a car of a railway train having brake equipment including a brake cylinder, and a brake pipe extending from the locomotive through each car of the train, variations of pressure in the brake pipe being effective to cause fluid under pressure to be supplied to and released from the brake cylinder, said apparatus comprising fluid pressure responsive actuator means having a fluid pressure chamber, said actuator means being operatively responsive to supply of fluid under pressure to said fluid pressure chamber for effecting operation of the brake cylinder release valve to cause a release of fluid pressure from the brake cylinder, and valve means operatively responsive to brake pipe pressure within a predetermined range of pressures and to less than a predetermined rate of change of brake pipe pressure to effect supply of fluid under pressure to said fluid pressure chamber of said actuator means.

3. Apparatus for use on a train of cars having a normally charged brake pipe for effecting operation of the brake cylinder release valve on each of a plurality of cars in the train from a remote control station on the train, said apparatus comprising fluid pressure operated actuator means including a fluid pressure chamber, said actuator means being operatively responsive to fluid pressure supplied to said fluid pressure chamber to effect operation of the brake release valve to cause a brake release on the respective car, pressure responsive valve means on each car communicating with the brake pipe and being operatively responsive to a predetermined pressure of fluid in the brake pipe to be moved to a charging position, rate responsive valve means on each car communicating with the brake pipe and being operatively responsive to less than a predetermined rate of change of fluid pressure therein to be moved to a charging position, and conduit means via which fluid under pressure is conducted to said fluid pressure chamber of said actuator means when both said pressure responsive valve means and said rate responsive valve means are in their said charging positions respectively.

4. Railroad vehicle brake equipment comprising a normally charged brake pipe, a brake cylinder, a control valve device responsive to variations of pressure in the brake pipe for effecting the supply of fluid under pressure to and release of fluid under pressure from the brake cylinder to correspondingly effect the application and release of the vehicle brakes, a release valve device operative from a normal position, in which it establishes communication via which fluid under pressure is supplied to the brake cylinder under control of the control valve device, to an operated position cutting off said communication and venting fluid under pressure from the brake cylinder, fluid pressure operated actuator means operative upon the supply of fluid under pressure thereto for effecting the operation of said release valve device to its operated position, and fluid pressure responsive valve means responsive to establishment of a relatively low pressure in the brake pipe for effecting the supply of fluid under pressure from the brake pipe to the fluid pressure operated actuator means, and a second fluid pressure responsive valve means for preventing establishment of said communication so long as the pressure in the brake pipe changes at a rate exceeding a certain rate.

5. The combination with a brake pipe of a fluid pressure brake system on a train of cars, which system comprises a brake cylinder, a control valve device responsive to variations of pressure in the brake pipe for effecting the supply of fluid under pressure to and release of fluid under pressure from the brake cylinder to correspondingly effect the application and release of the vehicle brakes, of brake cylinder pressure release valve means operative from a normal position, in which it establishes communication via which fluid under pressure is supplied to the brake cylinder under control of the control valve device, to an operated position cutting off said communication and venting fluid under pressure from the brake cylinder, actuator means having a fluid pressure chamber and piston mechanism operable therein, said piston mechanism being operatively responsive to fluid pressure established in said fluid pressure chamber to operate the brake cylinder release valve to said operated position to cause a brake release and being responsive to venting of said fluid pressure chamber to restore said brake cylinder release valve to a condition wherein it may be operated in the usual manner to its said normal position, a brake pipe pressure responsive valve means operatively responsive to a predetermined brake pipe pressure to be moved to a charging position, and responsive to brake pipe pressure lower than or greater than said predetermined brake pipe pressure to be moved to a venting position to effect venting of said fluid pressure chamber of said actuator means, and rate responsive valve means operatively responsive to less than a predetermined rate of change of brake pipe pressure to be moved to a charging position to establish a communication cooperatively with said brake pipe pressure responsive valve means in said charging position for supplying fluid at brake pipe pressure to said fluid pressure chamber of said actuator means.

6. In a train brake equipment including a brake pipe, and on each car of the train a brake cylinder and a control valve operatively controlled responsive to variations of fluid under pressure in the brake pipe to effect supply of fluid under pressure to and release of fluid under pressure from the brake cylinder to apply and release the corresponding car brakes, the combination of a release valve on each car having operating lever means, said release valve being operatively responsive to movement of said lever means out of a normal position to effect venting of the brake cylinder on each car independently of the control valve, actuator means having a fluid pressure chamber, said actuator means being operatively responsive to fluid pressure established in said fluid pressure chamber to effect operational movement of said lever means of said release valve out of its normal position, and valve means having a plurality of fluid pressure chambers subject to fluid pressure in the brake pipe as controlled from the locomotive, said valve means being operatively responsive to supply of fluid to said brake pipe at less than a predetermined rate and to a predetermined pressure within a certain low range to effect supply of fluid under pressure to said fluid pressure chamber of said actuator means, said predetermined fluid pressure in the brake pipe being ineffective to cause operation of the control valves throughout the train.

No references cited.